Patented June 24, 1941

2,246,528

UNITED STATES PATENT OFFICE 2,246,528

SPICE

Albert Musher, New York, N. Y., assignor to Musher Corporation, New York, N. Y., a corporation of New Jersey No Drawing. Application July 1, 1939, Serial No. 282,341

9 Claims. (Cl. 99—140)

The present application relates to spices, and in a more general way to various flavoring substances, and still more particularly it relates to the production of new spice materials with increased flavor or other enhanced qualities.

Generally, the principal source of the spice flavor is within the essential spice oils, and these spice oils are generally contained within the cell structure of the spice.

In view of the fact that the spice flavors are generally held quite tightly within the structure of the spice materials, it is difficult in many instances to develop or remove a maximum amount of the spice flavors therefrom, in the cooking operation, or in other culinary or flavoring procedures that follow.

Also, in order to obtain the essential oils from the spices in the greatest amount, they are generally ground, or they are soaked in the materials in which they are being prepared, or they are solvent extracted, or pressed, etc.

This difficulty in removing the spice oil or flavoring therefrom, or this difficulty in obtaining the full spice strength that might be obtained, is due not only to the fact that the essential oils or other flavor-holding materials are closely and tightly held by the cells and structure of the spice, but also, the structure of the spice is generally of a tough or hard nature, and it is therefore quite resistant against the usual flavor removing operation, whether this be in conjunction with regular cooking procedures, or whether this be in conjunction with the extraction of the essential oils or flavors therefrom.

It is therefore among the objects of the present invention to provide spices and other flavoring materials in a condition whereby, in their usual culinary use, they will provide more strength in flavor than heretofore possible, and thereby so as to further result in increased economy in usage.

It is further among the objects of the present invention to provide spices and other flavoring materials from which may be produced enhanced flavoring essentials, either in yield, or in strength, or in both.

It is also an object of the present invention to provide improved methods for the extraction of the essential oil or other flavoring components from spices and flavoring materials.

Further, an object of the present invention is to provide a new and more economical method for the production of flavoring extracts, with enhanced flavor quality in the finished extract.

It is still further an object of the present invention to provide ground spices which have new flavoring producing qualities, new absorption qualities, new disintegrating qualities, and other new and enhanced qualities.

Still further objects and advantages will appear in the more detailed description set forth below, it being understood, however, that this more detailed description is given by way of illustration and explanation only, and not by way of limitation, since various changes therein may be made by those skilled in the art without departing from the scope and spirit of the present invention.

It has now been found that the above objects may be accomplished by subjecting the spice materials to an explosion procedure in order to substantially disrupt the body structure or the cell structure thereof. This thereby enables the exudation, or the extraction therefrom, more easily and in larger amounts, of the essential oils and other flavoring materials that they contain.

Examples of various types of spice materials that may be treated in accord with this invention are, for example, pungent leaves, barks, seeds, flowers, and rhizomes, and also other flavoring materials such as for instance vanilla beans, the rinds of various citrus fruits, and so forth. For the purpose of this application, the term "spice," or "flavoring materials" includes all of these materials.

More specific examples of various spice materials that may be used in conjunction with this invention, are, for example, ginger, turmeric, bay leaf, various leaves of the mint family, tarragon, cloves, sassafras, cinnamon, caraway, rose leaf, cassia, sage, mustard seed, nutmeg, mace, anise, pepper, dill, allspice and so forth.

The use of the explosion process as herein described may be used in conjunction with various other processes as for instance freezing, cooking, enzymic action, dehydration, etc., in accord with the product being treated, and so as to produce different qualities, and so as to enhance the various explosion procedures and various flavor development and flavor extraction qualities as herein described.

In the case of spice or flavoring materials which are of a relatively high moisture content as, for instance, over 30% to 35%, it is advisable, before subjecting them to the explosion process, to dehydrate them to a moisture content below 30% to 35% and preferably below 15% to 20% and in many cases below 8% to 10%.

This drying process should remove the required amount of water content from the product so as to enable sufficient firmness of structure to enable the required explosion therein.

However, in the case of a majority of spice materials, these are of a relatively low moisture content as for instance under 10% to 15%, so this dehydration procedure is generally not necessary, unless, of course, their moisture content is increased prior to explosion by some of the accessory methods herein described, as for instance, by cooking or steaming.

These spice or flavoring materials are then subjected to a treatment at a relatively elevated temperature and pressure. After they are subjected to the elevated pressure and temperature for the required period of time, they are immediately and instantaneously released to a lower pressure and temperature, so as to expand or explode this spice material, or so as to disrupt the structure thereof, or the cells or fibers therein.

In carrying out this invention, the pressure is usually above 20 or 25 pounds per square inch and preferably it should be above 40 or 50 pounds per square inch, and in many cases it may run as high as 350 or 450 pounds or more per square inch.

With reference to the temperatures that are utilized, these temperatures are generally above 200° F. to 250° F., and they may run as high as 700° F. or 800° F., or higher. However, generally, the temperature range runs between around 350° F. and 550° F.

The required time for explosion may be 10 or 12 minutes, or longer, or it may be under 10 minutes, or it may be even less than several minutes, whereas in many cases it may be under one minute, and often several seconds or 15 to 45 seconds will suffice to complete the treatment and give the best results.

The explosion treatment is carried out for a time period and at a temperature and pressure depending upon a number of factors, as for instance, the moisture present within the spice material, the softness or hardness of the spice material, the degree of expansion or disruption desired, the type of equipment used, whether dry heat or steam or superheated steam is used in the expansion chamber, and also the conditions of time, temperature and pressure will depend upon the variability of these conditions themselves, as well as upon other factors.

If the product to be exploded is a little too dry to enable proper explosion, additional moisture may be added to the product or to the expanding chamber, as for example, in the form of water or other aqueous material, or in the form of steam or superheated steam.

After this treatment at elevated temperatures and pressures, the spice material is suddenly and instantaneously released to atmospheric temperature and pressure, or to a substantially lower temperature and pressure, as for instance, by suddenly opening the pressure gun or the particular vessel in which the spice material has been treated.

This expansion or explosion treatment is generally carried out in a steam atmosphere, and the steam may be developed by various methods, as for instance, from the moisture within the material that is being processed, or by injection into the pressure chamber of steam, etc.

The equipment that is used for this explosion procedure may be for instance, a pressure gun, or other suitable apparatus which will supply the conditions that are desired.

As one example of the combined time, temperature, and pressure factors that may be used in conjunction with some spice materials, the spice seed or root may be subjected in an atmosphere of steam to a pressure of 60 pounds per square inch, for 20 to 30 seconds, at a temperature of about 450° F. or 500° F., and then, the pressure chamber is suddenly opened so as to instantaneously release the spice material to atmospheric temperature and pressure.

After the spice or flavor-containing material has been treated in accord with the process herein described, it is found that its structure, and particularly the cells or fibers therein, is in a disrupted condition. After the disruption of the fibers or cells, the essential oil and the other flavoring materials contained therein are in a substantially more easily-releasable condition, and they are in a condition whereby they may be extracted or utilized in a substantially more increased amount than heretofore possible. In many cases it will be found that the structure of the spice or flavoring material has to a large degree been torn, separated, or softened and that a large number of passages and pores have been formed, many of which may be greater than capillary size, and many of which may be of a communicating nature.

These passages and pores, and the generally increased water absorbent nature of the spice materials, now permits water, oil, alcohol, or other solvents or cooking materials to more readily penetrate into the spices and thereby to more readily develop, or extract these flavoring elements.

If it is desired to produce various extracts, or essential oils, or other flavoring materials from these exploded materials, various procedures may be used. For instance, distillation may be used in conjunction with the extraction of various volatile oils, or alcohol may be used as a solvent in conjunction with the preparation of various extracts such as from the vanilla bean, or pressure may be used with products as for instance citrus rinds, in obtaining the oil therefrom. Also, these materials may be used in the usual cooking or culinary procedures, or they may be otherwise used as required either in the normal cooking or flavoring procedures, or in the various extraction or expression procedures.

Of course, the type and variety of spice or flavoring material that is being treated should be given consideration in the explosion procedure that is used. For instance, with leafy or thin bodied materials such as for instance, mint leaves, the temperatures, pressures, or time periods should generally be substantially lower than for various seed spices, or where there is present a relatively thicker or tougher body structure. If these conditions are not carefully controlled for the individual spice material that is being used, the resultant spice flavor may be affected either in flavor or in other of its qualities. Generally, because of the different resultant products that may be produced in the explosion of leafy or thin bodied materials as compared with the tougher or more compact or larger bodied materials as for instance various roots or seeds, the explosion conditions should be controlled and adjusted accordingly.

In order to develop and utilize various protectives for the flavoring essentials within these spices, or in order to develop various other characteristics, these spice materials may be ejected from the explosion or pressure chamber into atmospheres having higher or lower pressures than atmospheric, or into a partial or complete vacuum, or also into various atmospheres which may contain carbon dioxide, nitrogen, ozone, or which may contain oil or aqueous vapors, or they may even be ejected into various liquid or molten oils or fats, or into various aqueous materials, or into sugar syrup, or molten sugar, and so forth.

In the case of many flavoring materials, the high temperature or pressure that is necessary in order to disrupt the structure sufficiently may cause a deterioration in the quality of these flavoring essentials. Therefore, although this procedure of explosion, or disruption, or expansion, may be carried out in one step, it also may be carried out in a plurality of steps in which the same, or different pressures and temperatures and time periods may be utilized. For example, the spice material may be subjected to one, or two, or three, or more, explosion or expansion treatments of the same, or of varied temperatures and pressures, or for time periods that are the same, or higher, or lower, than each other.

This procedure of multiple explosion is of considerable importance with spice materials, and particularly with those that are of a relatively delicate nature and cannot stand the high heat or high pressure conditions that are necessary.

In these cases, a multiple explosion procedure at a lower pressure or temperature has advantages over a single explosion at a higher temperature and pressure, because, by this multiple procedure, the time, temperature and pressure of the various explosion processes may be so regulated that each explosion of the multiple process is not sufficient to give the full disruption that is required, but instead, relatively less intense explosions may take place, which, in the aggregate will produce substantially the disruption and the results that are desired.

It is desirable at times to place a coating on or within the spice pieces so as to permit the formation of harder walls, and thereby, so as to result in a greater or more efficient explosion of the product. Starch, resins, sugars, gums, and similar materials may be used to provide such a coating, as for instance, by mixing these materials with water or aqueous material, and then coating the spice pieces, and then allowing to dry thereon.

The explosion procedure of this invention may be regulated so that the spice will retain substantially its unity following the explosion procedure, rather than to be exploded into a relatively disintegrated form.

The spice or flavoring materials, after they have been exploded, may be ground, or pulverized, or otherwise treated, as desired.

Either in their whole condition, or in their ground or pulverized condition, they may be dipped into, or coated with a plastic or molten fat so as to retard discoloration, and so as to produce other enhanced qualities, as, for instance, enabling higher retention of flavor, keeping the fibers and cells softer, etc. Also, the spice or flavoring materials may be coated or treated with molten sugar, or with liquid oils, or with other materials to produce the various effects that are desired.

In the carrying out of this invention it is generally advisable to use materials of a relatively low starch content, as for instance materials containing generally less than 25% of starch, and preferably less than 12% to 14%, or even less than 5% to 6%. In the event that a substantial amount of starch is present, and particularly relatively insoluble starch, there may be interference with the extraction of the essential oils or flavoring materials from the spices, in view of the fact that there is a tendency for gelatinized starch to absorb and retain these flavoring materials, and thereby to develop some difficulty in the extraction thereof.

In the case of spices that are of a relatively large size, it is generally advisable to cut or break them into relatively smaller pieces before the explosion procedure, so that their interior portions will be exposed. As a result of cutting or breaking these spice or flavor containing materials into smaller portions, there will tend to be formed in the resultant product, a product with more widely distributed pores and exploded portions.

As one embodiment of this invention, the exploded spice materials may be coated, impregnated, or otherwise protected with protective materials, and particularly with water repellent materials such as oils and fats, and preferably with fats that are in a plastic or hardened condition at room temperature. However, under various conditions, various other materials or combinations thereof may be used for impregnation, coating, etc., as for instance sugar, preferably when it is of a quickly dissolvable nature. Examples of fats or oils that may be used in the various embodiments of this invention are for instance palm kernel stearin, hydrogenated cottonseed oil, olive oil, sesame oil, oleo-stearin, and so forth.

Fats of a hardened or plastic nature, and also sugar, or various other materials may also be used as required as binding agents, where it is desired to form the materials of this invention, either by themselves, or in conjunction with other materials, into cakes, briquettes, or other individual units.

The explosion procedure of this invention is particularly adaptable to briquetting, in view of the fact that in the development of the pores of the exploded product, there is then possible a firmer binding of the materials together in view of the tendency of the binding materials to seep into, and anchor itself within the pores, and within the structure of the materials that are being bound together.

In the carrying out of this invention, various accessory procedures may be used in conjunction with the expansion and explosion procedures as herein described, so as to enhance the structure disruption or softening of these spices, or so as to enhance the extraction or expression of the materials therefrom. For instance, there may be used in conjunction with the explosion procedure various operations such as soaking or boiling the material in oil, fat, or aqueous materials, or there may be used freezing, cooking, steaming, or various combinations of these, or other operations.

These procedures may take place at various points, as for instance preliminary to, after, or as an accessory to the explosion operation so as to further enhance the procedures herein disclosed.

As one possible embodiment of this invention, the material which is to be pressed, or from which oil or flavoring material is to be extracted, may be cooked or steamed, for instance, and the resultant product may then be dehydrated to a sufficiently low moisture content so as to enable the proper expansion or explosion operation that follows thereafter.

In order to retain as much as possible of the flavors and essences and qualities of the flavoring materials, various procedures may be used, as for instance, cooking or steaming under vacuum, or under pressure, etc., or in the presence of inert gases.

Another embodiment of this invention that may be used in order to enhance the extraction or expression procedures, or in order to enhance the softness or other qualities of the spice materials, is to subject the spice to a freezing operation, and particularly to a slow freezing operation, which will have the effect of rupturing the cell structure or softening the fiber and cell structure of the material.

In subjecting these materials to a freezing operation there should of course be present a sufficient amount of water throughout the spice material, which moisture content may vary, for example, between 30% and 95%, and for best results it should generally be over 30% to 40%.

In carrying out the freezing operation, the spice material may be frozen slowly, for instance, at temperatures ranging between 0° F. and 32° F., although, in many cases, preferred temperatures may run down to minus 20° F. or even lower. Various temperatures and various lengths of time may be used as required.

In general it should be said that it is desirable to carry out the freezing operation in such a way that there will not be the formation of small fine ice crystals with the consequent lack of rupture of the cells of the structure, but rather, there should be the formation of relatively large ice crystals, sufficient to puncture, break, rupture or disrupt the cell structure, or the fiber structure, or the body structure, substantially throughout the body of the particular material that is being treated.

Whereas the steaming or cooking operation herein described may be utilized by itself, it also may be utilized in conjunction with the freezing operation. For instance, the spice material may first be steamed or cooked, and it then may be exposed to the freezing procedure as herein described. These procedures have a tendency to soften or enhance the quality of the flavor-containing material so as to improve the yield of the essential oils or flavors that are held therein, and so as particularly to aid in the increase of the spice flavor of the particular spice piece.

Of course, following the cooking or steaming or freezing procedures, these materials should be dried or dehydrated to the required moisture content so as to enable satisfactory expansion or explosion.

In the expression or extraction of the essential oils from the spice materials, various methods may be used as for instance, solvent extraction with materials such as water, oil, carbon bisulphide, alcohol, or other solvents, or, also, pressure, distillation or other procedures may be used. Further, if desired, the solvent medium and the exploded material may be treated or ground together so as to enhance the removal of the flavoring material therefrom.

Generally it is desired to use non-leguminous seeds and materials in carrying out this invention because, although leguminous materials may be treated as herein described, nevertheless, there is generally, a considerable increased difficulty in obtaining the adequate yield of oil therefrom due apparently to the unusual type of retentive absorbency that seems to exist when these materials are exploded. This results in their holding the oil therein unusually tightly.

Also, in the carrying out of this invention, it is preferred to use spice materials of an originally low water content, as for instance, under 30% to 35%, or preferably under 15% to 20%, or even under 10% to 12%, because the dehydration or other processes that are normally necessary with materials of high water content usually may result in a tendency towards a weakening or loss of various flavor elements.

Although the process as herein described may be utilized in conjunction with the commercial extraction of essential oils and flavoring materials from the spice materials, or in conjunction with the manufacture of various flavoring extracts, nevertheless one of the important purposes is to provide spices and flavoring-containing materials in an entirely new condition in which they may be used for ordinary culinary purposes so as to provide their spice or flavoring essentials in a considerably more intensified or more enhanced, economical, or easier obtainable form than heretofore possible.

In the carrying out of this invention the resultant product that is produced as the end product of this invention, may be of various moisture contents, but it usually has been found that it is preferred to have at least 2% to 3% of moisture in the final product, or to have 5% or 6% of moisture so as to enable better retention of various water soluble flavors, and also for other purposes.

A still further embodiment of this invention is found in the grinding or pulverizing of the spices. It is found that when the spice materials have first been exploded or expanded in accord with the invention as herein described, that they may then be powdered or pulverized so as to form new types of grinds, and with new flavor producing quality. Not only do these new ground, exploded spices have substantially enhanced flavor characteristics, but they have a softness and an absorbent quality that provides entirely new advantages in culinary use.

What I claim is:

1. An expanded, structure disrupted, exploded spice material, said spice material retaining substantially its original unity, the spice flavor of said spice material being more readily extractable.

2. An expanded, structure disrupted, exploded spice material, said spice material retaining substantially its original unity, the spice flavor of said spice material being more readily extractable, said spice material being coated with an edible material so as to provide enhanced retention of the spice flavor within the spice.

3. A ground, expanded, structure disrupted, exploded spice material, said ground spice material exhibiting improved absorbent quality so as to enable improved absorption and retention therein of the spice oils or flavors exuded from the disrupted cells, and the spice flavor being more readily extractable from said ground spice material.

4. The method of producing a spice that retains substantially its original unity with the spice flavor being more readily extractable, said method comprising subjecting the spice to an elevated temperature and pressure and subsequently suddenly releasing the temperature and pressure to a lower temperature and pressure, said procedure thereby producing a spice of structure disrupted condition.

5. The method of producing a flavoring extract from a spice, said method comprising subjecting the spice to an elevated temperature and pressure, and subsequently suddenly releasing to a lower temperature and pressure, and thereafter treating with a solvent.

6. The method of producing a flavoring material from a spice, said method comprising subjecting the spice to an elevated temperature and pressure, and subsequently suddenly releasing to a lower temperature and pressure, and thereafter removing the flavoring material therefrom.

7. The spice material of claim 1, the spice material being ginger root.

8. The spice material of claim 1, the spice material being cinnamon.

9. The spice material of claim 1, the spice material being mint leaves.

ALBERT MUSHER.